United States Patent [19]

Rist et al.

[11] Patent Number: 4,882,772

[45] Date of Patent: Nov. 21, 1989

[54] ELECTRO-OPTICAL LIGHT BEAM SIGNAL TRANSMISSION SYSTEM

[75] Inventors: Bruno A. Rist, Woodland Hills; Alberto L. Casanova, Van Nuys, both of Calif.

[73] Assignee: Telescript Industries, Inc., Van Nuys, Calif.

[21] Appl. No.: 79,856

[22] Filed: Jul. 30, 1987

Related U.S. Application Data

[63] Continuation-in-part of Ser. No. 76,830, Jul. 23, 1987, abandoned.

[51] Int. Cl.[4] .............................................. H04B 9/00
[52] U.S. Cl. .................................... 455/617; 250/239; 250/491.1; 357/81; 455/609
[58] Field of Search .................. 350/96.18; 250/491.1, 250/239; 455/606, 607, 617, 618, 619, 605, 609, 611, 614; 174/16 HS; 136/225, 204; 357/81; 361/386

[56] References Cited

U.S. PATENT DOCUMENTS

| | | | |
|---|---|---|---|
| 796,254 | 8/1905 | Hartmann et al. | 455/606 |
| 2,153,709 | 4/1939 | Bournisien | 455/614 |
| 4,330,204 | 5/1982 | Dye | 455/607 |
| 4,603,975 | 8/1986 | Cinzori | 455/606 |
| 4,665,707 | 5/1987 | Hamilton | 361/384 |
| 4,729,061 | 3/1988 | Brown | 361/386 |

Primary Examiner—Robert L. Griffin
Assistant Examiner—Leslie Van Beek
Attorney, Agent, or Firm—David O'Reilly

[57] ABSTRACT

An electro-optical coherent light beam signal transmission system capable of transmitting signals occupying a wide bandwidth collimated beam for a substantial distance. The system has a coherent light generator modulated at a wide bandwidth and a reflecting mirror system that radiates the modulated coherent light generated in a selected direction and spreads the said coherent light into a collimated beam having a safe energy level distribution. A coherent light receiving module in alignment with the radiated coherent light beam decollimates and focusses the coherent beam on a light sensor. Subsequently the communications signal is distributed to end users through cable systems. The coherent light generator is preferably a semiconductor coherent light generating diode and includes a temperature monitoring and regulating system which maintains coherent light generator at an optimum operating temperature for peak output levels.

21 Claims, 5 Drawing Sheets

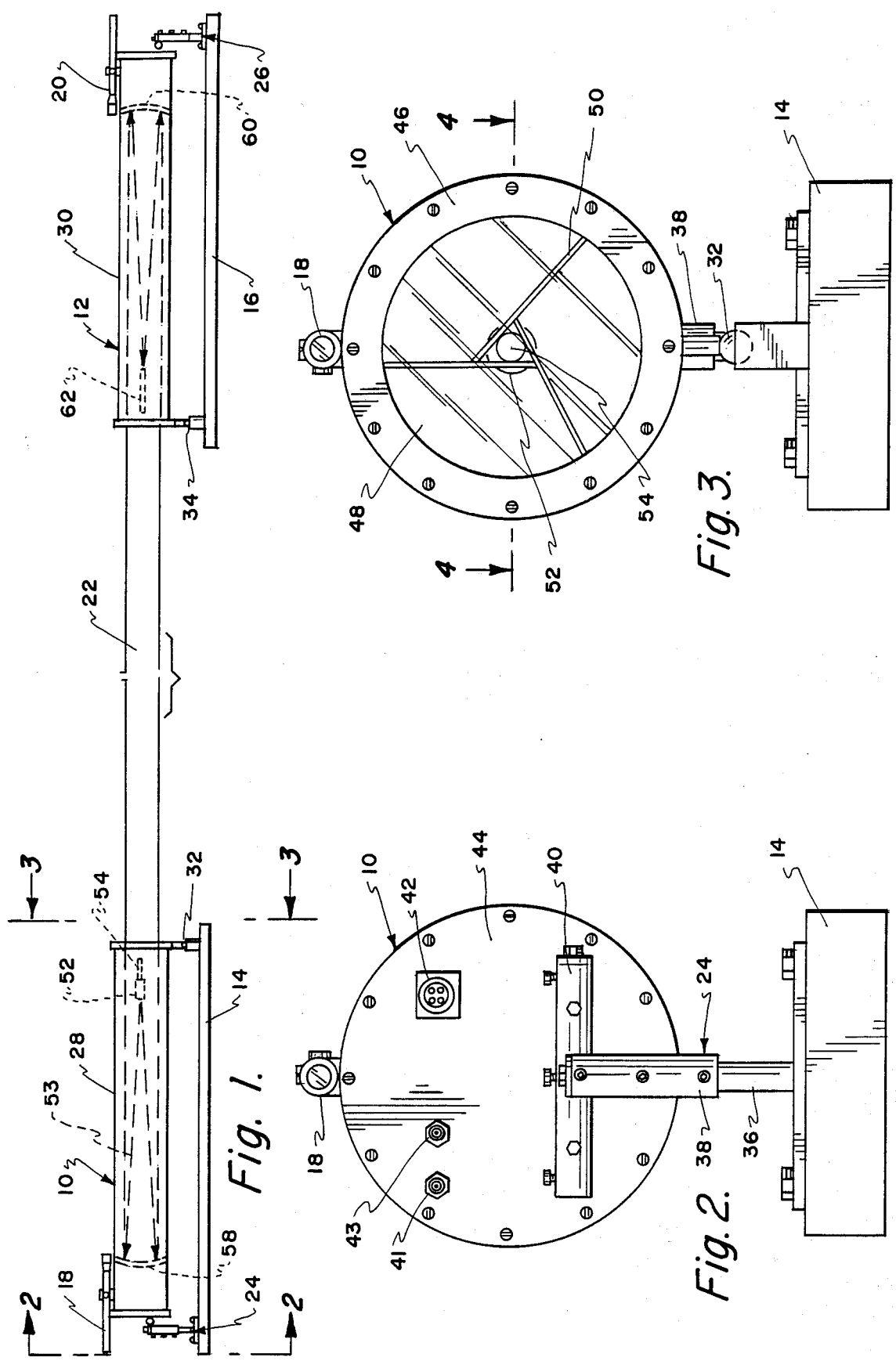

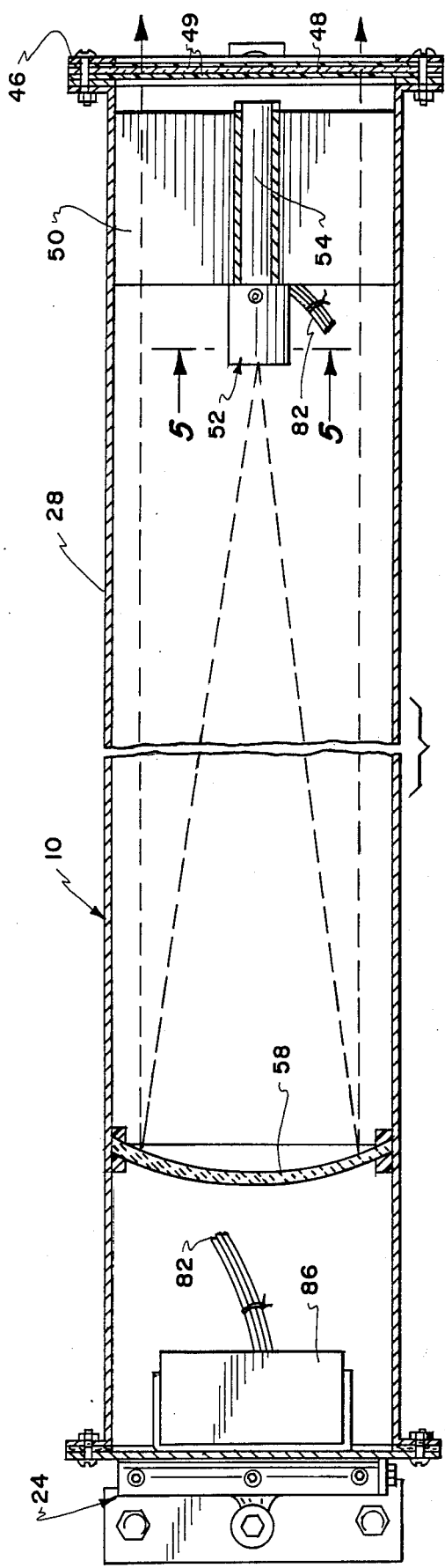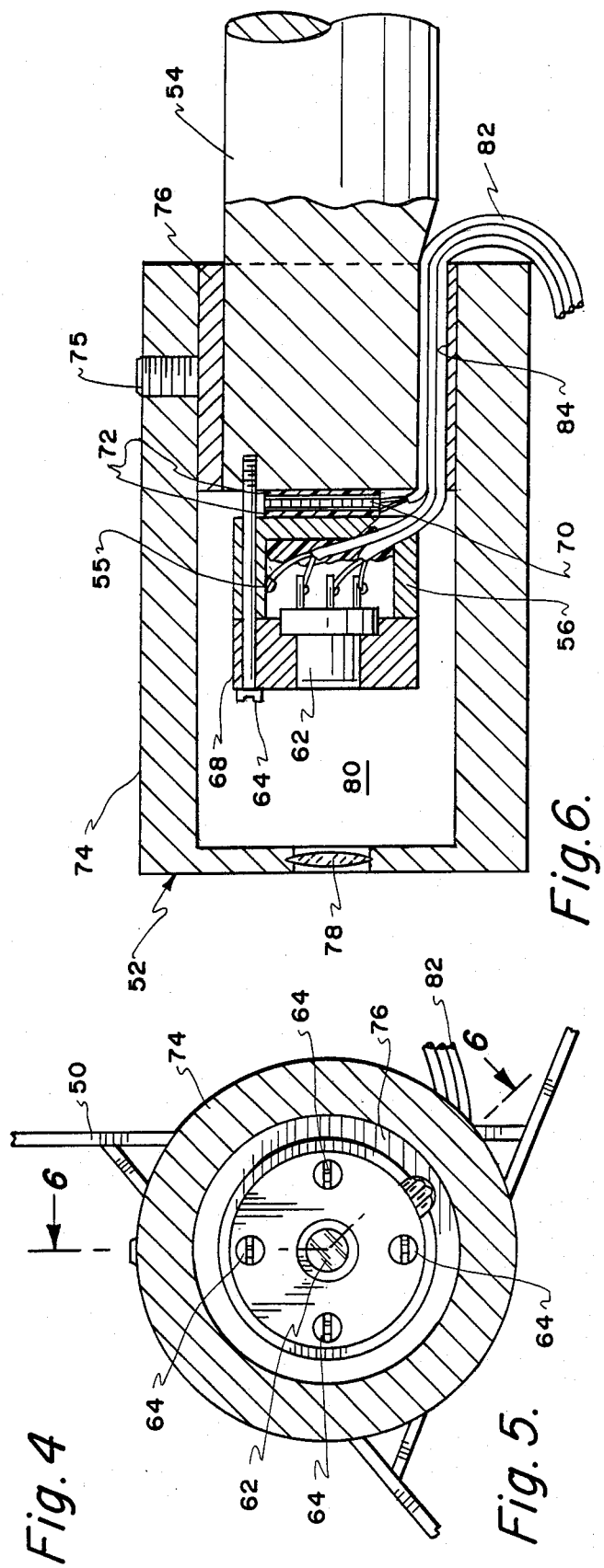

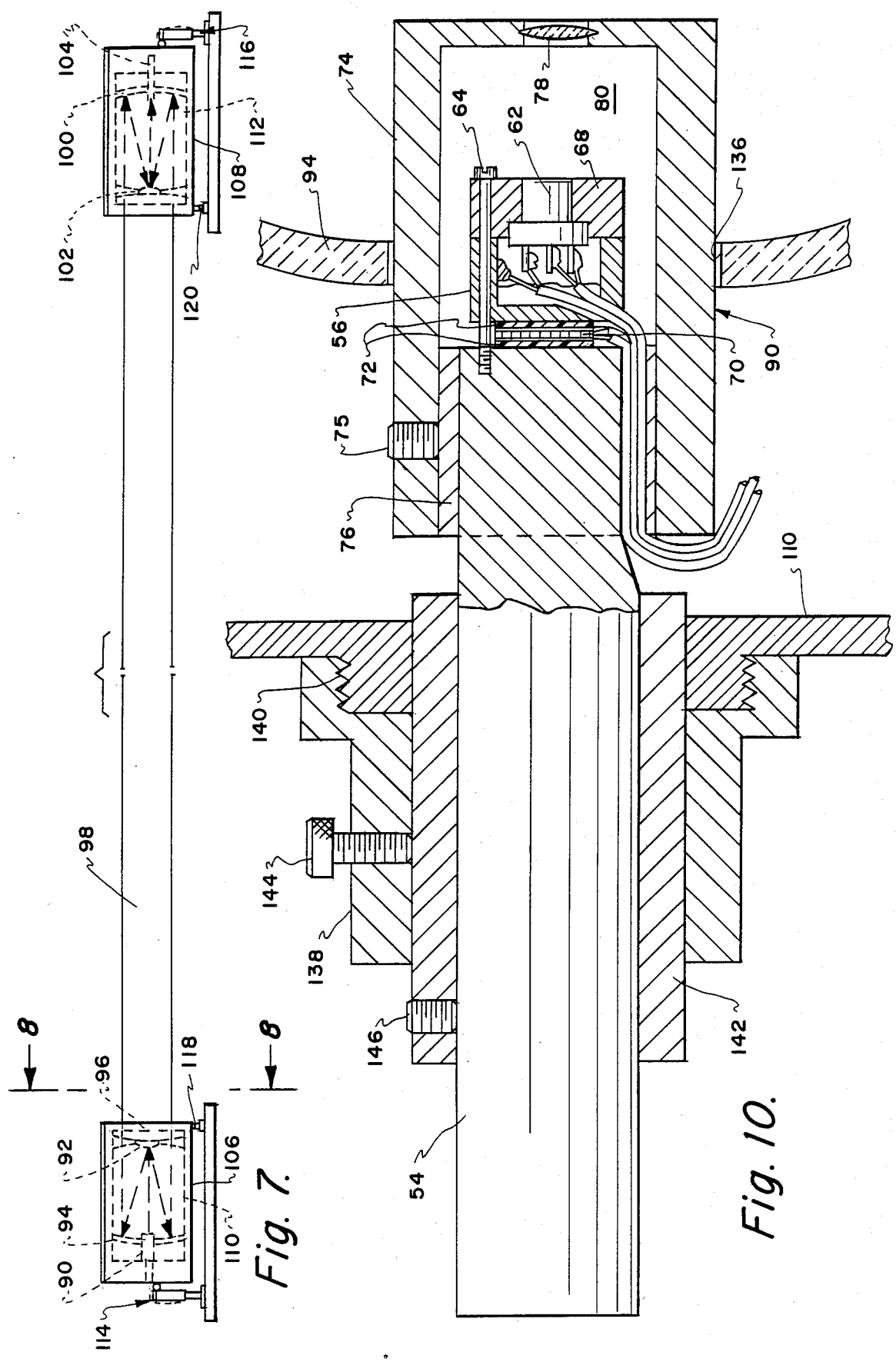

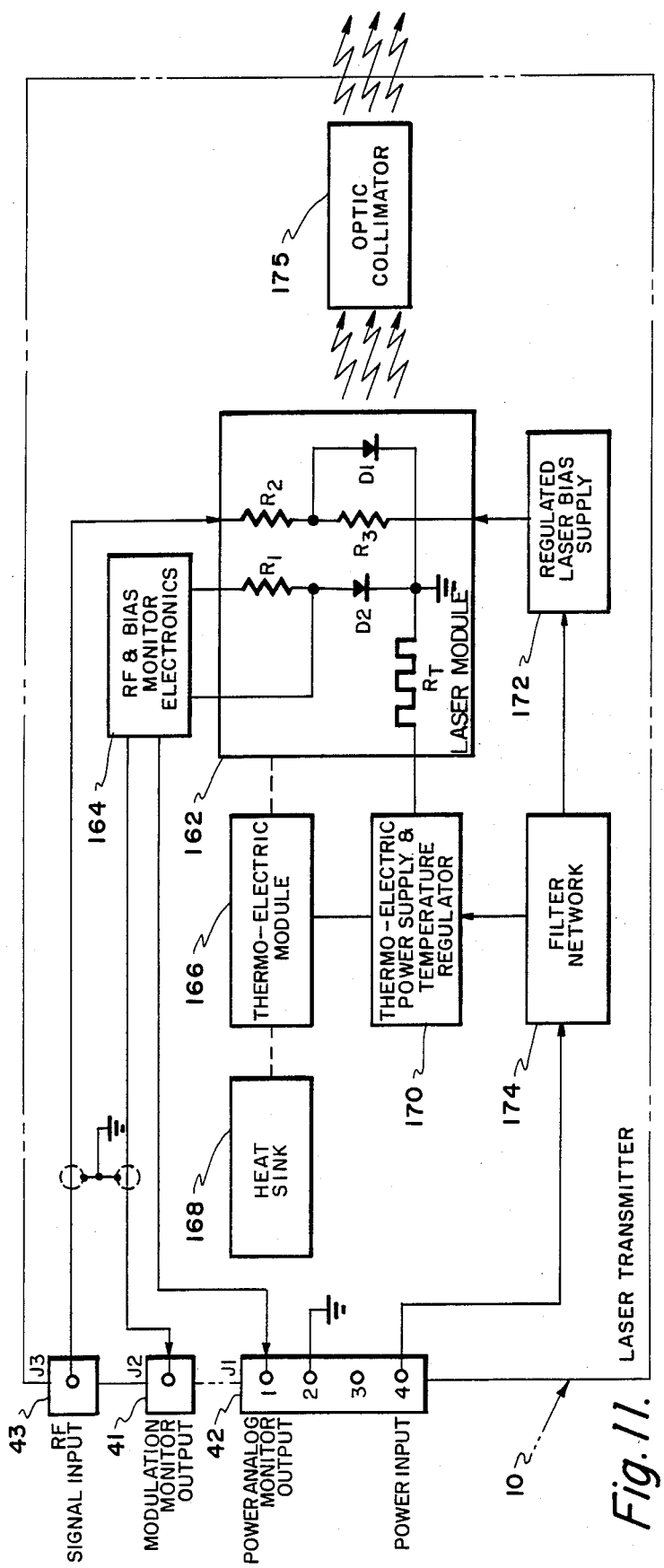
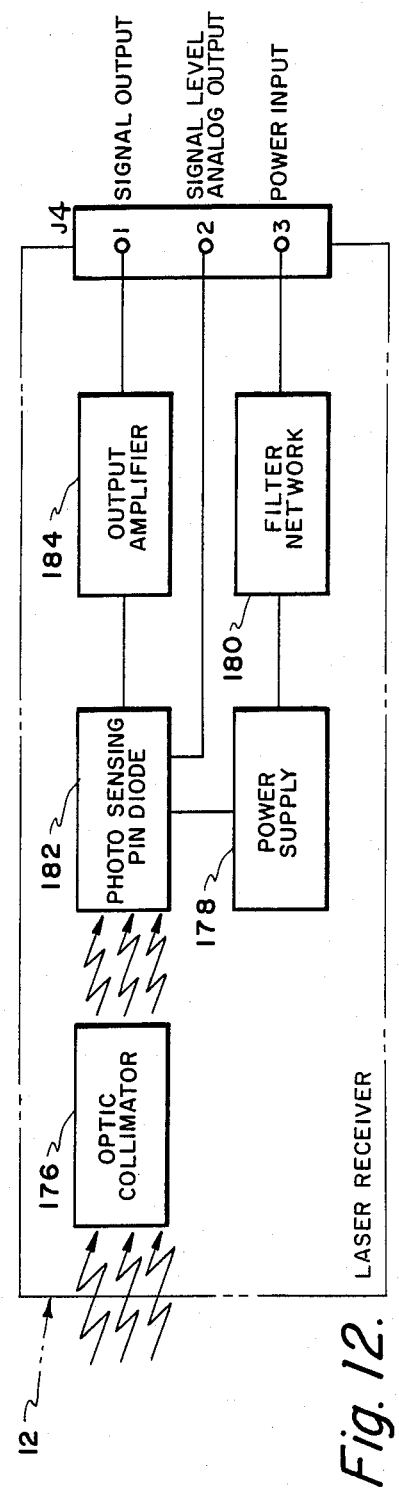
Fig. 11.
Fig. 12.

ELECTRO-OPTICAL LIGHT BEAM SIGNAL TRANSMISSION SYSTEM

This application is a Continuation-in-Part of Application Ser. No. 076,830 filed July 23, 1987, now abandoned.

FIELD OF THE INVENTION

This invention relates to communications signal transmission systems, particularly relates to electro-optical light beam television, telephone and digital data transmission systems.

BACKGROUND OF THE INVENTION

Although cable television and communication systems have experienced extremely rapid growth, many areas, particularly urban, are still inaccessible because installations are inconvenient or impossible. Installation of cables in developed urban areas is difficult because of immovable construction and municipal regulations that require underground cables because external poles are no longer permitted. Cable operators are faced with either high costs of installation, or difficult installation in previously developed areas. Various municipal utilities, tunnels, underground ducts and other features of communities prevent the installation of cables.

A potential solution to these problems is over the air RF transmission for short distances, but restrictive regulations either prohibit such transmissions or make them costly and impractical. Licenses would be required, which are time consuming to obtain or unavailable.

To solve these problems various systems have been devised, some of which use light beams or laserlinks for line-of-sight transmissions. Previous systems, however, have been limited by narrow bandwidths and poor performance caused by mechanical stability limitations. Further, such transmissions have usually been limited to a few channels. Previously implemented systems are inadequate for the massive amounts of signal transmissions needed for a useful and efficient system.

Systems have been designed using laser beams for transmission of information, but to date they have achieved wide acceptance only over fiberoptic cables rather than through the atmosphere. Atmospheric systems suffered a variety of problems not the least of which were insufficient bandwidth, aiming problems, and poor mechanical stability. Added to these are the inherent safety hazards of laser beams to the eye which could make safe installation questionable. Federal regulatory agencies severly restrict the use of laser light beams at levels which might present a health hazard. It would be desirable if a system could be designed which took advantage of the wide bandwidths inherently available from laser beams, but which also could provide adequate safety at low cost.

It is, therefore, an object of the present invention to provide an electro-optical communications signal transmission system using a laser beam which is not a health hazard.

Yet another object of the present invention is to provide a communications signal transmission and distribution system that takes advantage of the extremely wide bandwidth of a laser beam.

Still a further object of the present invention is to provide a television and digital data transmission system which can be easily installed in urban areas where cables are inconvenient or impossible to use.

Still another object of the present invention is to provide a communications signal transmission system which uses a laser beam providing efficient signal transmission.

Still another object of the present invention is to provide a communications signal transmission system having a laser beam optic system which spreads beam energy to safe energy levels.

Still another object of the present invention is to provide a communication signal transmission system which uses a laser beam that provides an efficient signal to noise ratio at the receiver because the signal is not scattered.

Still a further object of the present invention is to provide a communications signal transmission system using a laser beam system which is effecienly modulated to provide a wide bandwidth.

A further object of the invention is to provide a laser beam transmission system having strong signal security as there are no stray signals.

BRIEF DESCRIPTION OF THE INVENTION

The purpose of the present invention is to develop an environmentally safe electro-optical communications signal transmission system having large bandwidth and range for use where direct cable connections are inconvenient or impossible.

The laser (light amplification by stimulated emission radiation) produces a coherent type of radiation which has been proposed for a wide range of uses. As laser development has advanced, instruments using lasers have found an increasing number of applications in various technologies. Some uses proposed have been for communication systems but many problems had to be solved. These problems are frequency stability, modulation bandwidth and efficiency, mode selection and atmosphere effects which interfere with efficient operation. Atmosphere effects primarily absorption, refraction and scattering are factors which impede communications application for point to point service. The system of the present invention avoids or reduces these effects providing a wide bandwidth, efficient system for transmitting digital data or television signals and resolving some of the difficulties of beam pointing and other factors.

The system of the present invention facilitates television and digital data communication distribution systems in urban areas, where the installation cables are inconvenient or impossible, by using a coherent light beam generator or laser beam which is not a health hazard. The laser beam is mounted in a housing and focused on a mirror system which provides a spread beam which can be efficiently transmitted for long distances. The coherent light beam is collimated in such a way as to produce a low energy concentration in a beam that essentially has no fringe field and does not present a health hazard. A beam diameter of up to eight inches (8") reduces the concentrated beam energy per unit area so that possible danger to the human eye is eliminated.

An additional advantage of the collimated beam is the reduction of environmental interference so that alignment of transmitter and receiver is more efficiently achieved.

The system is comprised of a laser beam efficiently modulated by a method which allows a wide bandwidth so that many television signals, or digital data signals, can be transmitted. The laser beam is mounted in a housing which provides cooling to maintain the highest efficiency and longest life. The laser beam is positioned, in one embodiment, at the focal point of a reflecting mirror system which provides a collimated cylindrical beam sufficiently spread to reduce the health hazards from the laser energy.

Heat is dissipated by mounting the laser module on a solid copper slug heat sink supported by a spider in a cylindrical tube. The laser beam generator is centrally located to focus on a primary reflecting mirror, in one embodiment, which collimates the beam output. A heat pump couples the laser generator to the solid copper slug to dissipate heat energy generated by the laser device.

Additionally, maximum output is aided by surrounding the laser generator with a cap having a window providing a small air space between the laser generator and a focussing lens in the cap. The cap is mounted on a collar in mechanical contact with the heat dissipating solid copper slug. In this manner heat is transmitted to the cap to warm the air space between the laser generator and the focussing lens in the cap. This prevents the focussing lens from fogging and reducing beam energy.

The diffusion of the laser beam, to an approximately eight inch collimated beam, reduces energy density thus eliminating the need for special safety provisions or governmental licenses. The laser beam energy is at a sufficiently low level per unit area that there is no significant danger to the human eye, even if looking directly into the source of the spread beam. The beam diameter is twenty times greater, or more, than the pupil of the eye.

A further advantage of the spread beam is the considerable reduction of stringent requirements for beam alignment, as well as alignment stability. The transmitter and receiver can be easily mounted, with alignment being a simple procedure because of the large collimated beam. Further, the large beam tends to integrate the effects of scintillation and other disturbances commonly occuring in air, thus improving the signal to noise ratio at the receiver. An additional advantage is inherent signal security, because there are no stray signals that can be easily intercepted. The system is a point to point laser link and is directional.

The beam is collimated by use of a Newtonian-type or a more compact Cassegrainian-type optical system. Beam spread is a function of aperture and calibration adjustments; it is optimized for tolerance to environmentally induced drifts and disturbances.

The system disclosed provides an effective solution to the safe transmission of communication signals over useful distances. These signals may occupy an extremely wide bandwidth allowing many channels to be transmitted safely and effeciently. The system is constructed to be easily and conveniently installed on elevated surfaces, such as building roof tops and towers. The wide spread beam is not only safe but permits easy alignment of the transmitter and receiver after installation.

The above and other features of this invention will be fully understood from the following detailed description and the accompanying drawings, in which:

BRIEF DESCRIPTION OF THE DRAWINGS

FIG. 1 is a side elevation diagramatically illustrating an electro-optical light beam signal transmission system, according to the invention.

FIG. 2 is a view taken at 2—2 of the transmitter portion of the system of FIG. 1.

FIG. 3 is a view taken at 3—3 of FIG. 1.

FIG. 4 is a sectional view of the light beam transmitting system taken at 4—4 of FIG. 3.

FIG. 5 is a sectional view taken at 5—5 of FIG. 4.

FIG. 6 is a sectional view taken at 6—6 of FIG. 5.

FIG. 7 is a side elevation of a second embodiment of the invention using a Cassegrainian lens system for the light beam signal transmission system.

FIG. 10 is a sectional view of the laser generator mounting system of the system of FIG. 7, taken at 10—10 of FIG. 9.

FIG. 11 is a schematic block diagram of the laser beam transmitter according to the invention.

FIG. 12 is a block diagram of a laser beam receiver according to the invention.

DETAILED DESCRIPTION OF THE INVENTION

Figure 8:
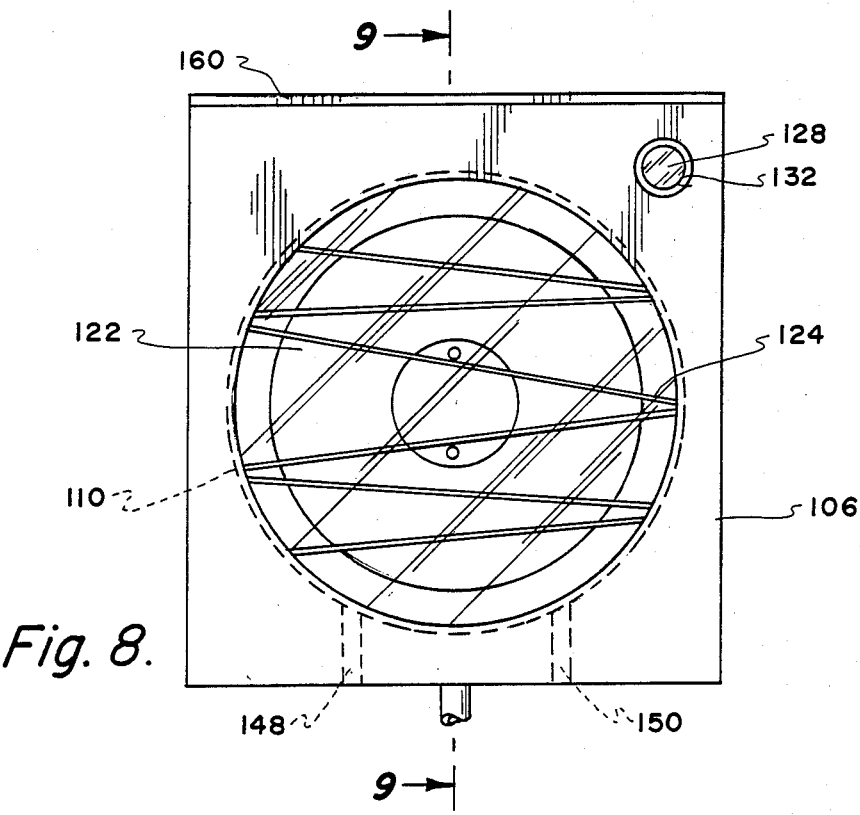
FIG. 8 is a view taken at 8—8 of FIG. 7.

A electro-optical light beam transmission system for distribution of digital and television signals is illustrated generally in FIG. 1. The system of FIG. 1 is comprised of a transmitter 10 and a receiver 12 each mounted at some elevated position on a building, or the like, indicated at 14 and 16. Both the transmitter and the receiver include telescopes 18 and 20 for aligning the beam 22 after mounting. Transmitter 10 and receiver 12 are aligned by a mechanical adjustment 24 and 26 which allows both vertical as well as horizontal adjustment of the rear end of the tubes 28 and 30 housing the components of the transmitter and receiver respectively. The forward end of housings 28 and 30 are mounted in ball joints, or swivel mountings, 32 and 34 allowing the system the tilt or move easily from side to side or up and down. Mounting and alignment are easy because of the large diameter of the collimated, modulated light beam 22.

FIG. 2 illustrates the alignment systems 24 and 26 used to align the transmitter and receiver. The alignment system 24 is comprised of telescoping tubes 36 and 38, which provide vertical alignment with a similar arrangement of tubes at 40 permitting horizontal alignment. The systems are aligned by sighting through telescopes 18 and 20 and adjusting the rear end of the housing 28 and 30 for maximum signal reception.

Electrical connections are made to the circuits through plugs 41, 42 and 43 mounted on back plate 44 and is substantially the same for both embodiments. The modulating signals and inputs to the laser generator are connected though plug 43.

The front end of the transmitter, is illustrated in FIG. 3 and is comprised of a clamping ring 46 securing a window 48 to the end of tube 28 which will be described in greater detail hereinafter. The receiver housing is essentially the same. A laser mounting heat dissipating support system 50 centrally supports laser generator 52 mounted inside housing 28. Laser beam generator 52 is mounted on a heat dissipating solid copper slug 54 supported by the spider 50. Laser output beam 53 (FIG. 1) is focussed on a beam collimating primary mirror 58 providing a cylindrical or rod-shaped concentrated beam 22 which is transmitted to receiver 12. The beam enters housing 30 of receiver 12, impinges on collimating primary mirror 60 identical with mirror 58 which then focuses the beam on a light sensing device 62. Suitable amplification and signal distribution systems then transmit the signal to the locations desired.

The structure of the light beam transmission system is shown in greater detail in FIGS. 4 through 6. An important aspect of the invention is provision of efficient operation of the laser beam generating system by effectively dissipating excessive heat. For this purpose laser beam generator 52 is comprised of a laser beam device 62 attached to solid copper slug 54 by thermally insulating screws 64 securing an enclosure formed by cup 56 and end plate 68. A thermo-electric heat pump 70 clamped between the end of cup 56 and solid copper slug 54 pumps heat generated by laser device 62 to the heat dissipating copper slug 54. Thermo-electric heat pump 70 is secured in intimate contact to the laser mounting system by a suitable heat sink compound 72. Efficient operation of laser device 62 is assured by surrounding the mounting system with a cap 74 secured to a collar 76 mounted on the end of copper slug 54. Cap 74 has a glass focussing lens 78 in alignment with laser device 62. Cap 74 forms a cavity 80 of air which is warmed by heat conducted by copper slug through collar 76 to cap 74 to prevent fogging of focussing lens 78. This system prevents any attenuation of the laser beam by condensation on the lens through which the laser beam is focussed.

The laser device is connected through wires 82 exiting through passageway 84 in collar 76 and slug 54 for connection to power supply, voltage regulator and monitor electronics 86 (FIG. 4). The window 48 in the end of the transmitter and receiver 10 and 12 respectively has an anti-reflecting coating 49 on both sides to minimize attenuation of transmitted beam 22. Preferably housing 28 is a metal tube in contact with laser mounting spider 15 to aid in dissipating heat pumped from the laser by heat pump 70.

An alternate but preferred embodiment is illustrated in FIGS. 7 through 10. In this embodiment laser generating device 90 is mounted at the focus point of a Cassegrainian-type lens reflecting mirror system which will be described in greater detail hereinafter. The use of a Cassegrainian-type lens system simplifies the construction and reduces the size of the system.

A reflecting or catoptric telescope can be arranged variously. In the embodiment of FIG. 1 a single primary reflecting mirror is composed of a concave glass disk with one concave spherical surface having a thin highly reflective coating plated on it. The concave reflecting surface is a parabolic surface reflecting the laser beam along the axis of the cylindrical or tubular enclosure. The laser beam generator is placed at the axis of the single primary reflecting mirror which results in a necessarily long tubular enclosure. The single concave-mirror telescope forms a beam spread around the center of the beam coming from the laser generator.

The alternate embodiment of FIG. 7 uses a secondary reflecting mirror with an annular primary mirror similar to that of the embodiment of FIG. 1. In this type of telescope light entering the telescope reflects off the primary mirror and is focused off a concave or convex secondary mirror. After reflection at the secondary mirror, light rays travel along the central axis of a telescope tube to focus or emerge through a hole in the primary mirror to an accessible focal point adjacent the aperture in the primary mirror.

The embodiment of FIG. 7 uses this principal to transmit a light beam, rather than receive light as a telescope does. The structure is similar to that known as a Cassegrainian-type reflecting telescope in which light is received by a primary mirror travels along the central axis of a telescope tube to be reflected off a secondary mirror which then again reflects the light to travel along the axis of the tube to a focal point near an aperture in the center of the primary mirror. Folding of the optical path results in a more compact embodiment.

In the embodiment of FIG. 7 a light beam is transmitted rather than received. Laser generator 90 is placed at the focal point of secondary mirror 92 which reflects light off primary reflecting mirror 94 for transmission through correcting plate 96 providing a collimated laser beam 98.

At the receiving end the mirrors act as a telescope receiving the collimated coherent light laser beam 98 at a primary mirror 100 which is reflected of a secondary mirror 102 and focused on a photo sensor 104 such as a photo-pin diode.

A desirable advantage of the arrangement of the system shown in FIG. 7 is that a Cassegrainian-like telescope can be used by simply replacing the eyepiece with either the laser generator 90 or the photo sensor 104 to produce a compact easy to install system. Any two mirror Cassegrainian-like reflecting system may be utilized but a system having convex secondary mirrors 92 and 102 is preferred. This arrangement uses a strongly curved focal plane allowing a system which is quite short. The transmitter and receiver mirror systems are mounted in housings 106 an 108 which can be a simple rectangular housing since the reflecting mirror system itself is enclosed in tubular enclosures 110 and 112 respectively.

Housings 106 and 108 are themselves mounted on alignment systems 114 and 116 at the rear and pivotal ball joints 118 and 120 for easy adjustment as in the embodiment of FIG. 1.

Figure 9:
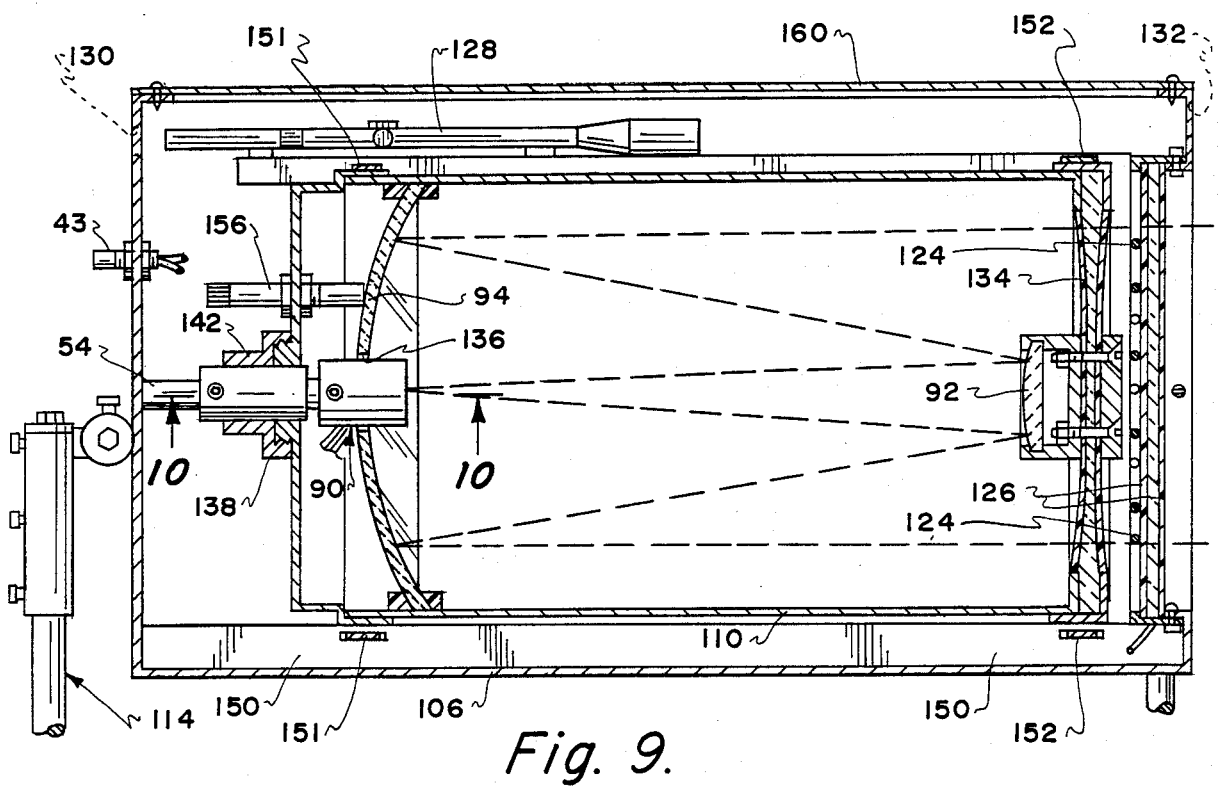
FIG. 9 is a sectional view of the Cassegrainian coupled laser beam transmitting system of FIG. 8.

The two mirror beam reflecting mounting system is shown in greater detail in FIGS. 8 and 9. The structure of the housing and mounting system is the same for both the transmitter and the receiver with the difference being that one has a laser coherent light generator module and the other has a photo sensor module; otherwise the construction is the same.

Referring to FIG. 8 housing 106 has a window 122 having tiny heating wires 124 on the rear surface similar to those used in glass defrosting systems. The window 122 is warmed to prevent condensation and has suitable anti-reflective coatings on each side at 126 (FIG. 9). The system is aligned using a telescope 128 and sighting through apertures 130 and 132 at opposite ends of the housing 106. A Cassegrainian-type telescope system is advantageous as they are readily available systems that have a convex secondary mirror 92 and a primary mirror 94 having a concave spherical surface. The system employs a lens 134 which provides two-sided aspheric corrections and is generally known as a correcting plate.

Primary mirror 94 has a central aperture or perforation at 136 which is nearly at the focal point of the convex secondary mirror 92. The convex secondary mirror 92 multiplies the effective focal length of primary mirror 94 which results in a focus at the central aperture 36 in the primary mirror. Primary mirror 94 has a diameter which preferably yields a collimated laser beam up to eight inches in diameter.

The system is novel in that readily available Cassegrainian-type mirror systems can be used with laser generator 90, and photo sensor 104, by simply replacing the eyepiece at the focus point of the secondary lens 92 or 102 respectively. One such system readily available is a System 2000 Schmidtt-Cassegrainian Optical System available from Meade Instrument Corporation, Costa Mesa, Calif.

Laser generator 90 is mounted as before for maximum dissipation of heat generated by the laser. The laser in FIG. 10 is a solid state laser diode 62 seated in cover plate 68 attached to base or cup 56 by insulating bolts 64 as before. Solid state laser diode 62 is positioned at the focal point of convex mirror 92 and is enclosed in end cap 74 having a focussing lens 78. Cap 74 is securely fastened to collar 76 by allen screw 75 to conduct heat from copper slug 54 to cavity 80 to prevent condensation on lens 78. Laser diode 62 is positioned in aperture 136 at the focal point of convex mirror 92 with cap 74 extending through aperture 136.

Laser diode 62 is adjustable positioned in aperture 136 by mounting on housing 142 with annular ring 138 threaded on boss 140. Copper slug 54 is secured in sleeve 142 for axial adjustment. Sleeve 142 is clamped by bolt 144 and is in turn clamped on copper heat dissipating slug 54 by allen screw 146. The copper slug 54 is axially adjustable by also loosening Allen screw 146, or both the slug 54 and sleeve 142 are adjustable by loosening bolt 144. This provides axial adjustment for accurate positioning of laser diode 62 at the focal point of secondary mirror 92, at the same time providing metal surfaces to aid in dissipating heat.

Thermo-electric heat pump 70, as before, is secured between laser diode mounting system 62 and copper slug 54 by heat sink compound 72 and draws heat away from the laser for dissipation by copper slug and it's mounting system.

Two mirror light transmitting system housing 110 is supported on support rails 148 and 150 (FIG. 8 in phantom) and held in place with straps 151 and 152. Adjustment of the lead screw 156 adjusts mirror 94. Housing 106 has a removable coverplate 160 providing access to alignment telescope 128 and the interior of housing 110.

When laser diode 62 is operating thermal electric heat pump module 70 pumps heat from cup 56 and plate 68 to copper slug 54 to maintain cool temperature in and around the laser. A preferred option is the incorporation of a cold temperature thermistor in the side wall of laser mounting cup 56 to monitor the temperature of the system for adjustment of the operation of heat pump 70. Laser generator 92 is kept at a temperature at or below zero degrees centigrade for extended life.

In operation digital data, television signals or any electronic signals carrying useful information, are applied through plug 42 to modulate laser generator 90 connected a regulated laser power supply. Solid state laser diode 95 is modulated through a seventy five Ohm cable matching resistor allowing the use of conventional amplifiers such as strip or cable amplifiers. This novel arrangement allows the system to occupy a wide bandwidth inherent in the solid state laser diode. Bandwidths greater than a gigahertz are possible with the design and arrangement described.

The laser transmitter is shown in the semi-schematic block diagram of FIG. 11 in which connector 42(J1) has input power on pin 4 and connector 43(J3) has a signal light. Coherent beam generator 162 is comprised of solid state diode laser D1 which emits near visable to infrared (IR) radiation. A wide range of laser emitting diodes emitting coherent light over a wide spectrum may be used in the system but a near visable to IR laser diode is preferred.

Monitor diode D2 intercepts or monitors part of the radiation from the laser diode D1 which is made available through RF & Bias Electronics 164 as a readout proportional to power emitted at J1, pin 1 as well as the modulation signal at 41 (J2). Both of these parameters are used and available respectively at rear panel connectors 42 (J1, pin 1) and 41 (J2) of the laser transmitter assembly 10 indicated within the phantom lines.

Laser D1 has limited efficiency as part of the energy supplied to drive it is converted to light, and a large portion is converted to heat. That heat is released to the enclosure surrounding the diode and is distributed through thermo-electric module 166 or heat pump to the heat pump to the heat sink 168 for dissipation. Temperature in the laser module 162 is monitored by temperature sensor $R_t$ which may be a thermo-sensor providing an output to thermo-electric power supply and temperature regulator 170 which regulates the operation of thermo-electric module 166. Preferably the temperature of the laser module 162 is maintained between zero degrees centigrade and minus 20 degrees centigrade, or in that approximate range. Also, low temperature operation increases radiating light output tremendously and extends life.

Regulated laser supply bias 172 sets the operating level (i.e. quiescent current) of laser diode D1 conditioning it for linear modulation by a signal input at connector 43(J3). Filter network 174 isolates and removes any induced surges, such as, lightning or other transient inputs.

The communication signal to be transmitted is applied from a standard strip amplifier, data interface, modem, or any other data source that produces signals compatible with the drive requirements of laser diode D1. The input on pin 2 is applied to laser diode D1 through a 75 Ohm resistor R2 that has two functions. Resistor R2 matches the drive capability, or the output and feed requirement, of a standard cable amplifier and other 75 Ohm output devices so that it provides a non-reflective load. Instead of a 75 Ohm cable, it sees a 75 Ohm resistor and all of the energy is absorbed in resistor R2. At the same time, because the 75 Ohm resistor is large compared to the impedance of diode D1 which is one (1) Ohm or less, you obtain a very efficient voltage to current conversion which makes modulation of the laser diode D1 very linear. This permits transmission of sixty (60) or more standard television channels over a single light beam from optic collimator 175 with coherent light generating diode D1 modulated in an extremely linear fashion even though driven between zero and saturation.

Receiver 12 is shown in the block diagram of FIG. 12 and has optics 176 which are the reverse of the laser transmitter optics in that they act as an optical decollimating antenna. The output of the optic decollimating antenna 176 is received by photo sensing pin diode 182 converting the coherent light beam optical input to an electronic output which is amplified in amplifier 184 and delivered through pin 1 of connector J4 to data or television distribution systems. A signal level analog voltage is made available for monitoring purposes at J4, pin 2. Power supply 178 and filter network 180 receive power input from pin 3 to accomodate the requirements of photo sensing pin diode 182 and amplifier 184.

Thus, there has been described a novel, compact efficient laser signal transmission system for transmission of digital data or television signals over great distances which occupy an extremely wide bandwidth. Alignment and acquisition problems have been reduced or eliminated and astmospheric effects of absorbtion, refraction or scattering by scintillating waves have been also minimized. The system provides an effective cable connection system where it is otherwise inconvenient to install and use underground or direct cable connections.

This invention is not to be limited by the embodiment shown in the drawings and described in the description, which is given by way of example and not of limitation, but only in accordance with the scope of the appended claims.

What is claimed is:

1. A coherent light beam transmission system comprising;
    coherent light generating means;
    modulating means for modulating said coherent light generating means over a wide bandwidth;
    radiating means for radiating said modulated coherent light generated in a selected direction;
    said radiating means including means for distributing said coherent light into a collimated beam having a safe energy level distribution;
    a focussing lens mounted in the path of coherent light radiating from said coherent light generating means for focussing said coherent light on said radiating means;
    means for preventing condensation of moisture on said focussing lens;
    said means for preventing condensation of moisture on said focussing lens comprising a cap having a central aperture said focussing lens being mounted in said central aperture, mounting means mounting said cap over said coherent light generating means, said cap enclosing a small volume of air between said coherent light generating means and said focussing lens; and heat sink means acting as a heat sink and warming means to warm said small volume of air to keep the focussing lens at at temperature greater than the outside air so that condensation of moisture on said focussing lens is prevented;
    coherent light receiving means in alignment with signal coherent light radiating means;
    decollimating means in said receiving means for decollimating said collimated beam, said decollimated means including means for focussing said coherent beam on light sensing means; and
    distribution means connected to said light sensing means for distributing the communications signal received.

2. The system according to claim 1 in which said modulating means comprises; a cable television signal; and a cable matching impedance connecting said cable television signal to said coherent light generating means.

3. The system according to claim 2 in which said coherent light generating means is a semiconductor coherent light generating means.

4. The system according to claim 3 including cooling means cooling said semiconductor coherent light generator; and
    cooling regulating means for regulating the operation of said cooling means to maintain said semiconductor coherent light generating means at an optimum operating temperature.

5. The system according to claim 4 in which said cooling means comprises;
    heat conducting means for mounting said semiconductor coherent light generating means;
    heat sink means comprised of a large heat conducting mass in heat transfer relationship to said heat conducting mean; and
    thermo-electric heat pump means mechanically connected between said heat conducting means and said heat sink means for pumping heat from said heat conducting means to said heat sink means.

6. The system according to claim 5 including temperature sensing means for sensing the operating temperature of said semiconductor coherent light generator; said temperature sensing means connected to control the operation of said thermo-electric heat pump means to maintain the most efficient operating temperature of said semiconductor coherent light generating means.

7. The system according to claim 6 in which the operating temperature of said semiconductor coherent light generating means is maintained at approximately zero degrees centigrade.

8. The system according to claim 7 in which said heat sink is a massive copper cylindrical slug; said slug constructed to provide a support for mounting said semiconductor coherent light generator.

9. The system according to claim 1 in which said means for warming said small volume of enclosed air comprises mechanically coupling said cap to said heat sink whereby heat is conducted to said cap to heat said small volume of air in said cap.

10. The system according to claim 1 in which said radiating means comprises; a primary concave reflecting mirror, and means mounting said coherent light generating means at the focal point of said primary concave reflecting mirror.

11. The system according to claim 10 in which said primary concave reflective mirror is a concave spherical mirror having a highly reflective coating on the spherical concave surface.

12. The system according to claim 11 in which said means for mounting said coherent light generating means comprises a tubular housing; a spider shaped support having a central socket for securely receiving heat sink means mounting said coherent light generating means; said spider shaped support maximum outer dimension being approximately equal to the interior diameter of said tubular housing; whereby said spider shaped support will tightly fit into said tubular housing and centrally position a coherent light source mounted in said central socket.

13. The system according to claim 10 in which said primary concave reflecting mirror is a concave spherical surface on which a highly reflective coating is plated.

14. The system according to claim 13 in which said coherent light generator radiates coherent light in the mean visible to infrared range.

15. The system according to claim 1 in which said radiating means comprising; a primary reflecting mirror; a secondary reflecting mirror in coaxial registration with said primary reflecting mirror; and mounting means mounting said coherent light generating means at a focal point of said secondary reflecting mirror.

16. The system according to claim 15 in which said primary reflecting mirror, secondary reflecting mirror and coherent light generating means are aligned on a common axis.

17. The system according to claim 16 in which said primary reflecting mirror has a central aperture; said secondary reflecting mirror having a focal point on said axis adjacent said aperture; said coherent light source being mounted in said aperture at the focal point of said secondary reflective mirror.

18. The system according to claim 16 including a correcting lens in the path of said coherent light radiated from said primary reflecting mirror whereby distortions in said light beam are corrected.

19. The system according to claim 18 in which said primary reflecting mirror is a concave spherical surface on which a highly reflective coating is plated.

20. The system according to claim 19 in which said primary reflecting mirror produces a beam having an approximately eight inch diameter.

21. The system according to claim 20 in which said coherent light generator radiates coherent light in the mean visible to infrared range.

* * * * *